Figure 4:
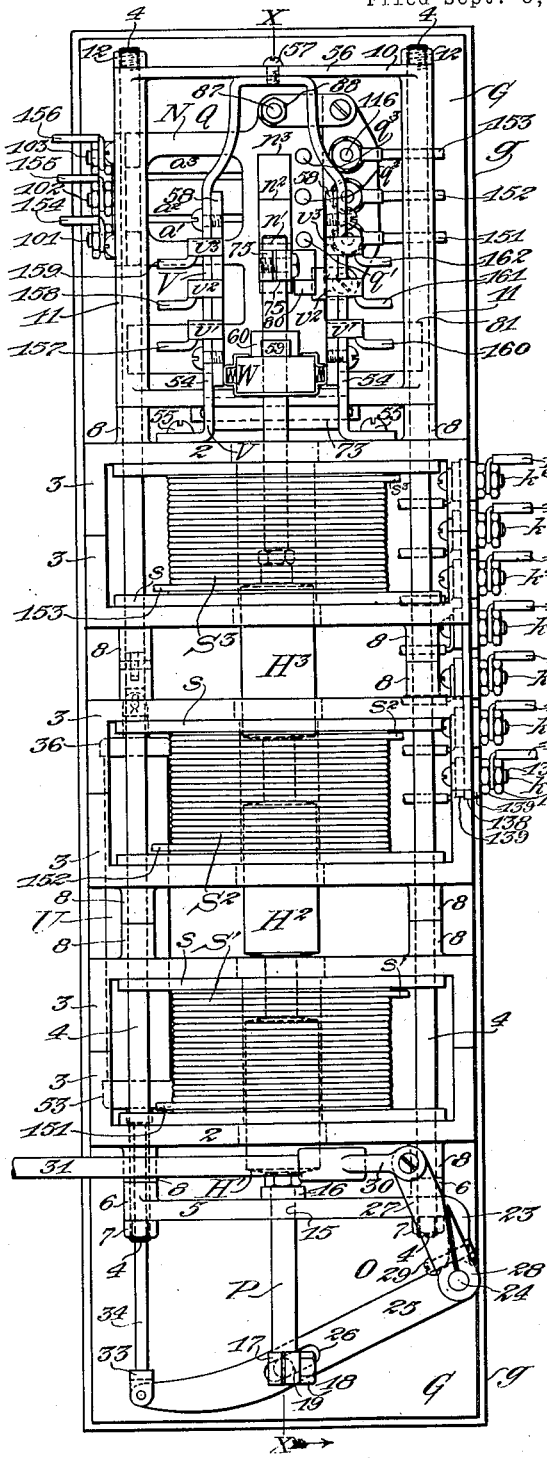

Mar. 13, 1923.
E. TREGONING
AUTOMATIC TEMPERATURE REGULATING DEVICE
Filed Sept. 6, 1919
1,448,012
4 sheets-sheet 1
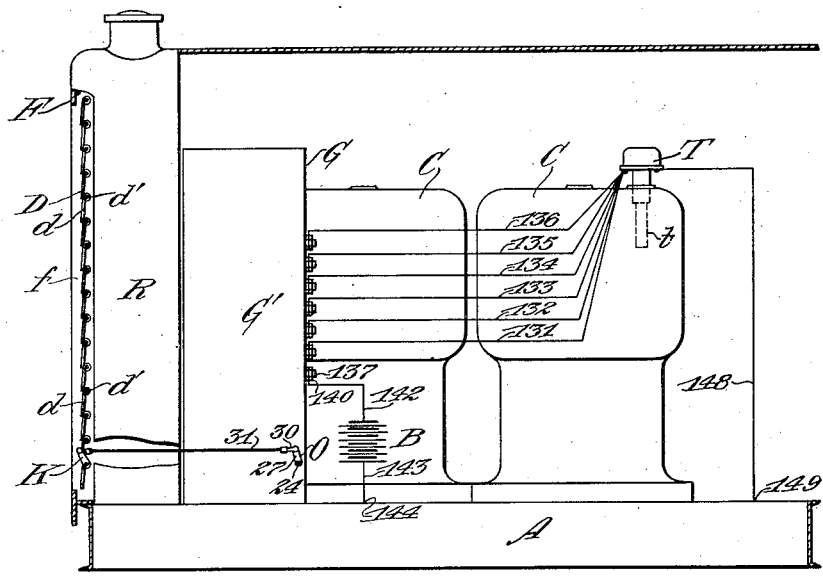
Fig. 1.
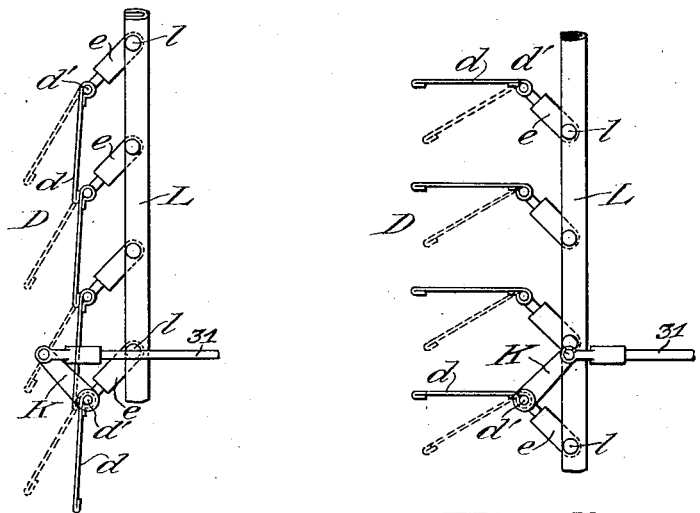
Fig. 2.
Fig. 3.
Inventor:
Edgar Tregoning
By
Attorney.

Mar. 13, 1923.

E. TREGONING

AUTOMATIC TEMPERATURE REGULATING DEVICE

Filed Sept. 6, 1919

1,448,012

4 sheets-sheet 2

Inventor:
Edgar Tregoning
By Arthur P. Pennington
Attorney.

Mar. 13, 1923.

E. TREGONING

AUTOMATIC TEMPERATURE REGULATING DEVICE

Filed Sept. 6, 1919

1,448,012

4 sheets-sheet 3

Inventor:
Edgar Tregoning
By
Arthur A. Armington
Attorney.

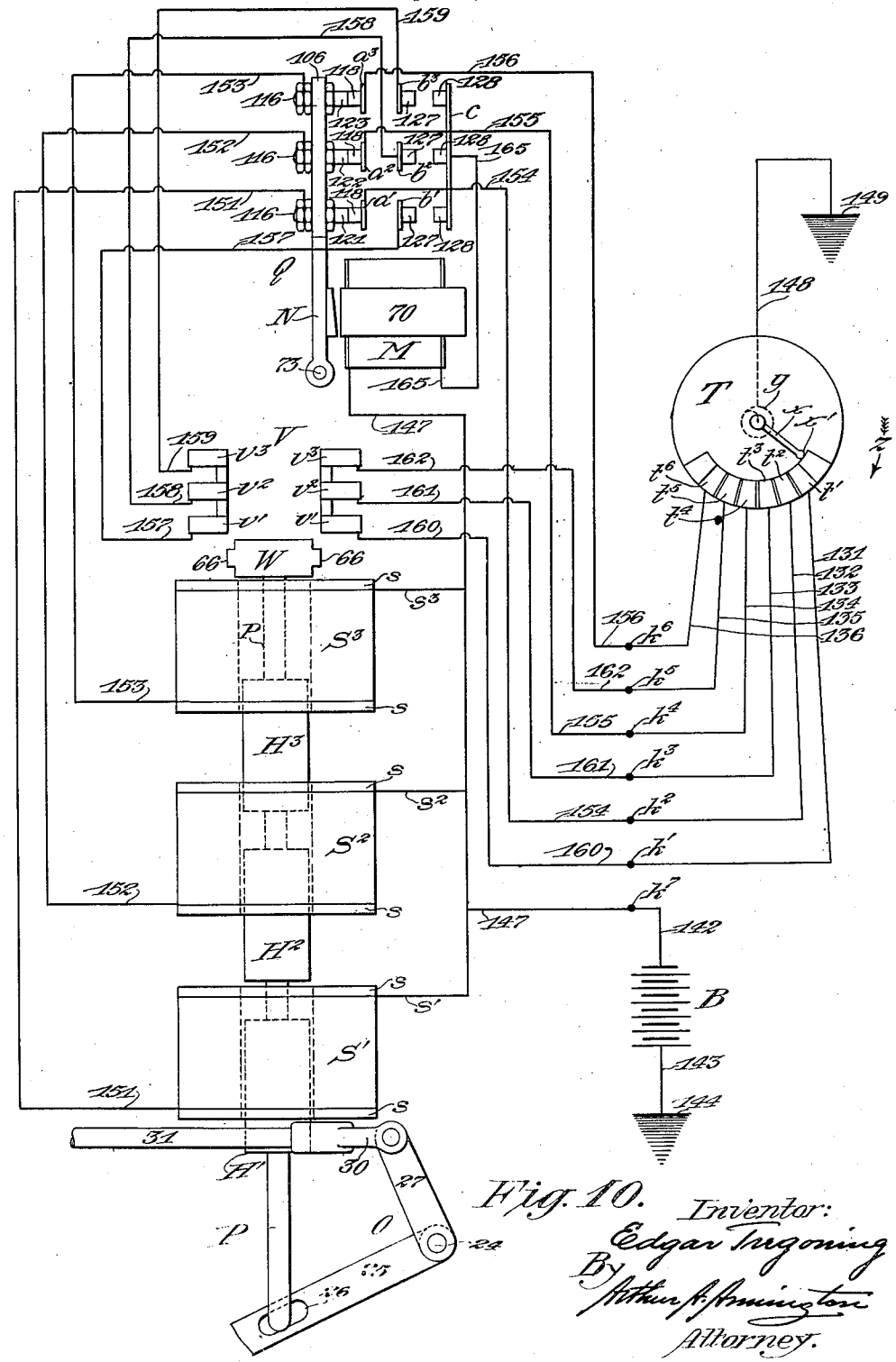

Patented Mar. 13, 1923.

1,448,012

UNITED STATES PATENT OFFICE.

EDGAR TREGONING, OF ATTLEBORO, MASSACHUSETTS.

AUTOMATIC TEMPERATURE-REGULATING DEVICE.

Application filed September 6, 1919. Serial No. 322,073.

*To all whom it may concern:*

Be it known that I, EDGAR TREGONING, a citizen of the United States, residing at Attleboro, in the county of Bristol, State of Massachusetts, have invented certain new and useful Improvements in Automatic Temperature-Regulating Devices, of which the following is a specification.

My invention is an improved apparatus for operating shutters, dampers, valves or other closures in regulating the temperature of internal-combustion engines on automobiles, airplanes, dirigible balloons, or for other like purposes such as with heating and ventilating systems. My improvement as herein shown is particularly adapted for use with shutters applied to the radiators of gas-engines, and the apparatus is arranged to act automatically to control the passage of air through the radiator to regulate the temperature of the cooling medium. For this purpose the shutter-operating means is controlled by a thermostat arranged adjacent the engine, and a particular object of the improvement is to adapt the device to open and close the shutter or other closure by degrees in accordance with slight changes in the temperature of the motor. Through this arrangement the engine is maintained at a substantially uniform temperature to insure the maximum degree of operating efficiency, without variation from the effect of changes in temperature of the atmosphere. The invention is designed for use on automobiles and other motor-driven road vehicles, and is of particular advantage for the engines of airships where extreme changes in temperature are encountered at different altitudes.

As before mentioned the apparatus is thermostatically-controlled and entirely automatic in action, and a further feature of the improvement consists in the arrangement of the electrical-means by which it is operated from a low voltage current with automatic switches for breaking the circuit to prevent waste of current when the mechanism is inactive.

Figure 5:
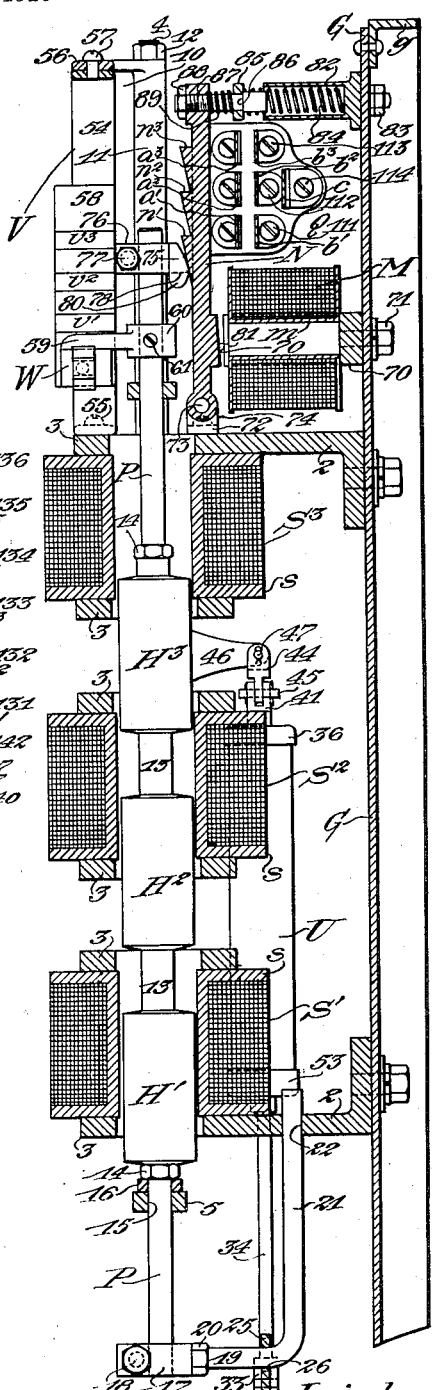
Figure 6:
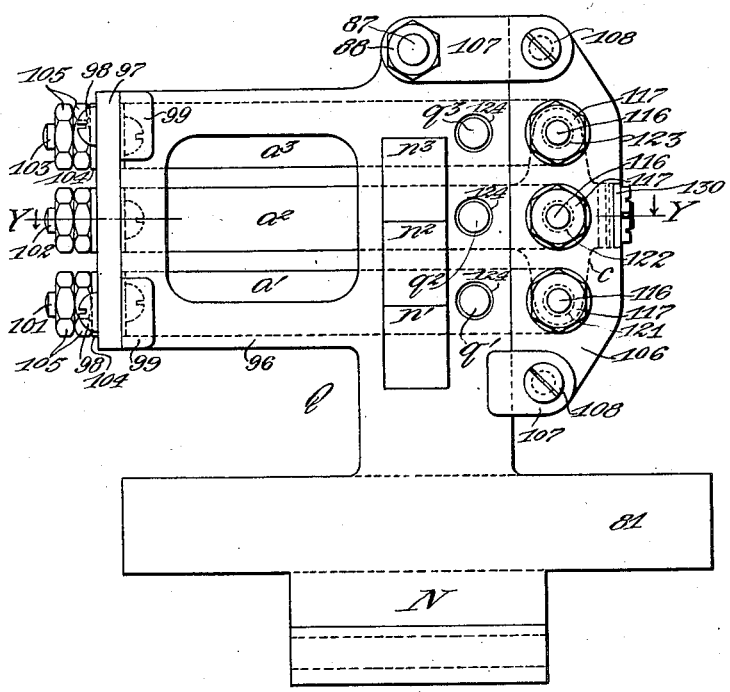
Figure 9:
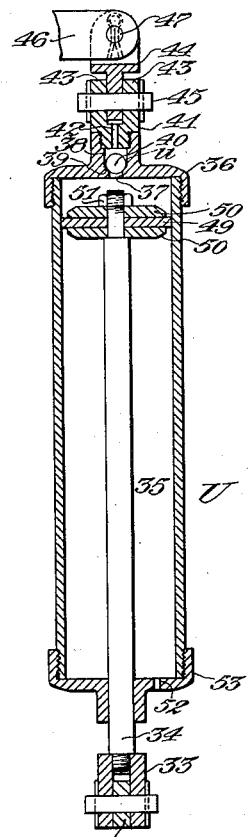
Figure 7:
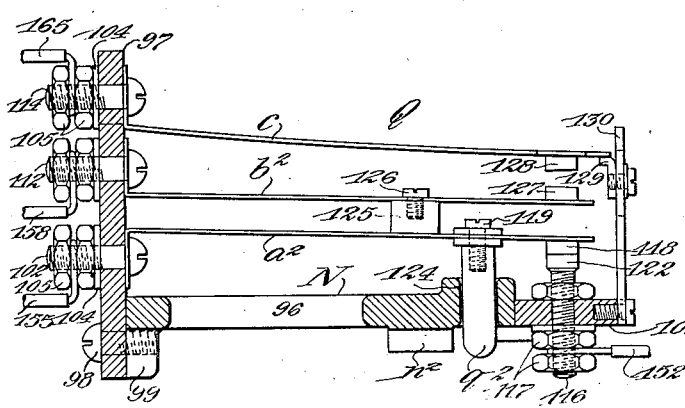
Figure 8:
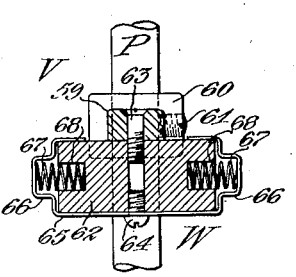

The manner and means for carrying out these improvements are fully described in the following specification, illustrated by the accompanying drawings, in which like reference characters designate like parts. In the drawings:

Fig. 1 is a general view of the power-plant of an automobile, showing the gas-engine, the water-cooling radiator, its air-shield or shutter, and illustrating my improved apparatus as applied thereto;

Fig. 2, an enlarged, vertical, sectional view of a portion of the radiator-shutter, showings its slats in closed position in full lines, and partly open in dotted lines;

Fig. 3, a similar view with the shutter-slats shown fully opened in full lines and closed to a slight degree in dotted lines;

Fig. 4, an enlarged, front elevation of the operating-mechanism of the device;

Fig. 5, a vertical, sectional view of the same taken on the line X—X of Fig. 4, looking in the direction indicated by the arrow;

Fig. 6, an enlarged detail view of the automatic multiple-switch of the device;

Fig. 7, a cross-sectional view of the same taken on the line Y—Y of Fig. 6, looking in the direction indicated by the arrow;

Fig. 8, a sectional view of the contact-device or circuit-closer which controls several circuits of the electrical connections;

Fig. 9, a vertical-sectional view of the dash-pot or pneumatic-cushion device for the sliding shutter-operating member of the apparatus; and Fig. 10, a diagram or chart of the complete electrical wiring-system of the apparatus.

Referring to the drawings, I have preferred to herein illustrate one embodiment of the invention as applied to a conventional type of internal-combustion engine such as generally used on automobiles and other self-propelled vehicles. In Fig. 1, C designates the upright cylinders of the motor; A the chassis-frame of the automobile on which it is mounted; and R the radiator disposed in advance of the engine and communicating with the water-jackets of the cylinders through suitable connections as usually arranged, but not herein shown or described. The casing or shell of the radiator R is extended at the front in an overhanging cowl or frame F, on which is mounted the shutter D or other closure for obstructing the passage of air through the radiator. Any suitable design of air-shield may be employed for this purpose, and as here shown it consists of a shutter D composed of a series of horizontal slats $d$ provided with trunnions $d'$ at their ends which are pivoted to turn in sockets in the opposite projecting flanges *f* of the radiator frame F. Projecting rearwardly from the trunnions of the several shutter-slats *d* are operating-arms *e*, see Figs. 2 and 3, which are pivotally joined at 1 to a vertical bar or link L, whereby all of the slats *d* are connected together to rock in unison when the link L is moved up or down. The slats *d* may be conveniently operated to open and close the shutter by means of a crank-arm K which is rigidly connected to the trunnion *d'* of the lower slat *d*.

My improved apparatus for operating the shutter may be conveniently located under the hood or bonnet of the automobile at the rear of the radiator R. For supporting the mechanism of the device I employ a vertical standard which may be in the form of a skeleton bracket, or constructed as a plate G, see Fig. 5, reinforced by a marginal flange *g* of angle-iron. The parts of the operating mechanism are mounted on the front of the standard or plate G and are protected from dirt and oil by a removable cover or casing G' attached to the sides of the plate, see Fig. 1. As before stated, the operation of the device is controlled from a thermostat T, which may be of any preferred type, and is usually mounted on one of the engine cylinders C as illustrated in Fig. 1.

In general, the present improved device operates on the same principle as that of my previous invention shown and described in United States Letters Patent No. 1,289,969, dated Dec. 31, 1918. The device of the prior patent, however, is limited in its range of action in that the shutter is opened or closed to the full extent at each operation; whereas in the present improvement the shutter slats are opened and closed by degrees in accordance with gradual fluctuations in the temperature of the engine. That is to say, one object of my present improvement is to provide for opening the shutter partially upon a slight rise in temperature, and to gradually enlarge the opening as the temperature increases; and, vise versa, to effect a variable degree in the closing action of the shutter as the temperature of the engine is lowered. Like my prior device the shutter-slats are operated from a slidable member which may be actuated by gravity to move it in one direction, and impelled by electro-magnetic means to shift it in the opposite direction. Where in the device of the prior patent the slidable shutter-operating member is raised against the force of gravity by a single electrical magnet or solenoid, in the present construction I employ a series of solenoids, two, three, or more, to operate the member with a step-by-step action. This new development and amplification of the apparatus entails an extension of the electrical circuit-closing devices and automatic cut-out switches, and I have accomplished the desired result by an extremely simple and compact arrangement of the mechanism as next described:

Referring particularly to Figs. 4 and 5, two horizontal arms or brackets 2—2 are bolted to the standard or back-plate G and serve as the main supports for the solenoids and other actuating-mechanism for the shutter-operating means. As herein illustrated I prefer to employ three lifting solenoids S', S² and S³ which are of the usual type comprising cylindrical windings on flanged spools *s*. The solenoids S', S², S³ are enclosed by rectangular shrouds 3, the upper and lower ones being constructed integral with the supporting arms 2—2 extending from the plate G. Extending through the shrouds 3 and fixedly secured therein are two vertical rods 4—4 which serve as supports for the other parts of the apparatus. The flanges of the solenoid-spools *s* are pierced at their rims to allow the rods 4—4 to pass through them to hold the solenoids laterally, the spools being preferably constructed of fiber, rubber or a similar dielectric material to insulate them from their surrounding shrouds. The rods 4—4 are braced apart at their lower ends by a cross-strut 5 formed with hubs 6—6 surrounding the rods and held thereon by nuts 7—7. The shrouds 3 also have hubs 8—8 surrounding the rods 4—4, those of the lower shrouds resting against the hubs of the cross-brace 5, while the opposite hubs on each shroud abut those of the next adjacent one to hold the several solenoids in spaced relation. The upper ends of the rods 4—4 are braced by a rectangular frame 10 having extended side hubs 11—11 held against the hubs of the upper solenoid shroud 3 by nuts 12—12 on the rods.

Extending through the axial openings of the solenoids is a vertical rod or plunger P which constitutes the slidable operating-member for the shutter D. The rod P carries a plurality of separate armatures or cores H', H², H³ for the several solenoids S', S², S³, the cores being preferably of laminated structure to increase the magnetic effect by which they are attracted to slide into the solenoids. The armatures H', H², H³ are spaced apart along the rod P by means of collars 13 and are held fast at the ends by nuts 14 screwed onto the rod. The lower end of the rod P slides in a bore 15 in the bottom cross-brace 5 and a washer 16 of leather or rubber arranged beneath the lower nut 14 acts as a buffer to cushion the movement of the rod as it drops into lowermost poistion. At the bottom of the rod P is a split block 17 clamped thereon by a binder-screw 18, and carrying an elbow-shaped rod 19 at one side, see Fig. 5. The rod 19 is screwed into the block 17 and held in place by a check-nut 20, with its right-angled extension 21 adapted to slide through a bearing 22 in the lower bracket 2 to serve as a brace or guide for the lower end of the plunger-rod P. Referring to Fig. 4, the right-hand end of the lower cross-brace 5 is formed with a downwardly-extending arm 23 provided with a hub at its end in which is journaled a cross-pin 24. Fast on the pin 24 is a lever 25 having a slot 26 intermediate its ends, through which extends the elbow-rod 19 to adapt the lever to be rocked from the sliding movement of the plunger P. The lever 25 constitutes one arm of a bell-crank designated O, its opposite arm 27 being made separate and formed with a split-hub 28 by which it is secured to the pin 24 by a binder-screw 29. The upper end of the bell-crank 27 is pivotally connected to a fork 30 secured to the end of a rod 31 reaching forward to the crank-arm K which operates the slats $d$ of the shutter D, see Figs. 1, 2 and 3. The arm 27 may be adjusted around the pin 24 by loosening its binder-screw 29, and in this manner the bell-crank O may be set to provide the proper connection with the shutter-operating crank K.

Pivotally connected to the lower end of the bell-crank arm 25 by a fork 33 is a rod 34 which constitutes the slidable plunger of a dash-pot U or retarding-device shown in detail in Fig. 9. This latter consists in a cylindrical air-chamber 35 which is closed at both ends and provided with a ball valve $u$ at the top. For this purpose the upper cap 36 of the cylinder 35 is formed with a neck having a central air-exhaust passage 37, above which is a larger opening or socket 38 providing a seat 39 for the ball
40. Screwed into the socket 38 is a plug 41 provided with a central air duct 42, and formed at the top with ears 43—43 adapted to straddle the sides of a fork-member 44. The ears 43—43 are secured to the fork 44 by a cross-pin 45, and the fork, in turn, is pivoted to the end of an arm 46 by means of a pin 47. The arm 46 projects rearwardly from the hub or boss 8 of the upper shroud 3, see Figs. 4 and 5, and forms the support for the dash-pot U which is suspended therefrom by the connections just described. The pivots of the connections provide a universal-joint to allow the cylinder 35 to rock to accommodate the movement of the plunger 34 under the rocking action of the lever 25. At the upper end of the plunger 34 is a fiber or leather washer 49 held between metal disks or washers 50—50 by means of a nut 51. The washer 49 is fitted to slide within the walls of the cylinder 35 as the plunger 34 descends with the downward stroke of the main shutter-operating plunger P. During this downward stroke of the plunger 34 the washer 49 causes the air in the cylinder 35 to be exhausted through a duct 52 in the bottom cap 53. At the same time the ball-valve $u$ at the top of the cylinder 35 will be held closed by gravity and thus the washer 49 will create a partial vacuum in the dash-pot whereby to retard the movement of the plunger 34 and thus cushion or ease the drop of the shutter-operating member P. When, however, the plunger 34 is raised with the lifting of the member P the valve $u$ will open to allow the air in the cylinder 35 to be exhausted through the duct 42, while air will enter the cylinder at the bottom through the duct 52, thus equalizing the pressure so that no resistance to the lifting action of the solenoids is encountered at the dash-pot.

Mounted on the shroud 3 of the upper solenoid $S^3$ is a yoke-like frame V having its opposite, parallel legs 54—54 formed with feet fastened to the shroud by means of screws 55—55. The frame V is braced at the top by the cross-member 56 of the frame 10, to which it is fastened by a screw 57. Fastened to the inner sides of the legs 54—54 of the frame V are insulating strips 58—58 of fiber, rubber or similar insulating-material, and let into their opposed faces are metal contact-plates $v'—v'$, $v^2—v^2$ and $v^3—v^3$. The contact-plates $v'—v'$, $v^2—v^2$ and $v^3—v^3$ are arranged in pairs and are spaced apart in series at a distance corresponding to the extent of lift of the plunger P at each step in its movement. The opposite contacts of each pair are adapted to be bridged by a circuit-closer or wiper W carried on the plunger-rod P. The wiper W is fastened to the end of an arm 59 projecting from a collar 60 secured to the rod P by a set-screw 61, see Fig. 5. As shown in detail in Fig. 8, the wiper W is constructed from a block 62 of fiber, wood or other insulating-material attached to the arm 59 by a screw 63. Fastened to the under side of the block 62 by means of a screw 64 is a relatively thin strip 65 of sheet-metal, preferably brass, having its extremities bent up around the ends of the block 62 and extending inwardly part way across its top. The ends of the strip 65 are bent outwardly to form two opposite, rectangular loops 66—66, within which are coiled springs 67—67 held in pockets 68—68 in the ends of the block 62. The springs 67 bear against the loops 66—66 to cause the latter to be sprung outwardly whereby to press them against the contact-plates $v'—v'$, etc., to insure the proper electrical connection therebetween. As the contact-member or wiper W is shifted from one set of contacts to the other it successively closes the several circuits leading from the thermostat T to the magnet-operated releasing-device for the plunger P, these parts and their electrical connections being more fully described hereinafter.

The multiple switch which operates to open and close the electrical circuits of the device under the control of the thermostat is indicated at Q in Figs. 4 and 5, and illustrated in detail in Figs. 6 and 7. The switch-blades and contacts are carried on a movable trigger-member N which constitutes a swinging armature adapted to be operated from a magnet M mounted on the back-plate or standard G. As shown in Fig. 5, the magnet M is composed of windings surrounding a spool $m$, and is supported from the plate G by a U-shaped shroud 70 of horse-shoe form held in place by bolts 71. The movable armature N is constructed in the form of a vertical plate hinged to a bracket 72 at its lower end by means of a pivot-pin 73. The bracket 72 is secured to the top of the shroud 3 of the upper solenoid $S^3$, and is provided with upstanding lugs or ears 74 in which the pivot-pin 73 is held. The armature N serves a double purpose; since in addition to providing means for operating the circuit-closing switches Q it acts as a movable detent or trigger for holding the shutter-operating plunger P in raised position after each successive lifting movement under the action of the solenoids $S'$, $S^2$, $S^3$. For this purpose the trigger N is provided with a plurality of stepped shoulders or catches $n'$, $n^2$, $n^3$ corresponding in number to the several solenoids employed for effecting the successive step-by-step lifting movements of the plunger P. Adapted for engagement with the detent-shoulders $n'$, $n^2$, $n^3$ is a latch-member 75 which projects from the side of a collar 76 held fast on the upper end of the plunger-rod P by means of a binder-screw 77. The inner end of the latch 75 is beveled off to adapt it to ride over the inclined faces of the detent-shoulders $n'$, $n^2$, $n^3$, which are of saw-tooth shape, and on its lower edge is a squared shoulder 78, illustrated by dotted line in Fig. 5, by which it engages the upper edge of each detent. Extended to the right of the latch 75, as viewed in Fig. 4, is a bevel-ended contact-wiper 80 having a rounded under side, as shown in Fig. 5, adapted to wipe across a series of plunger-studs $q'$, $q^2$, $q^3$ which are carried by the spring-tongues or blades of the multiple switch Q to be later described.

The armature-trigger N is formed with a cross-bar 81 for making contact with the ends of the opposite side-arms of the shroud 70 of the magnet M, while at its upper end is a spring-control device for normally holding it away from the magnet. This latter comprises a tubular stud 82 secured to the standard G by nuts 83 and serving as a pocket for a coiled compression-spring 84. The end of the spring 84 bears against a washer 85 abutting a shoulder 86 on a stud 87 which is screwed through the upper end of the armature N and held in place by a nut 88. A second coiled spring 89 surrounding the stud 87 at the front of the washer 85 holds the latter against the shoulder 86 and also serves as a buffer or cushioning device as the washer strikes against the end of the spring-pocket 82 when the armature is forced toward the magnet. Through this arrangement the armature N is allowed to yield as the latch 75 rides across the detent-shoulders or catches $n'$, $n^2$, $n^3$ and also swing toward the magnet M under the latter's attraction thereof.

The automatically-operated, multiple circuit-closing switch Q is shown in plan view in Fig. 6, and in horizontal cross-section in Fig. 7, taken on the line Y—Y of Fig. 6, looking in the direction indicated by the arrows. As before explained, the switch Q is carried on the armature N, being insulated therefrom by fiber extensions attached thereto and providing mountings for the switch-blades, the electrical-contacts and binding-posts. Projecting to the left of the central, upright arm of the armature N is a rectangular extension 96 to which is attached a rearwardly-extending fiber plate 97, see Fig. 7, secured thereto by screws 98 screwed into bosses 99. Extending through the plate 97 are three binding-posts 101, 102, 103, see Fig. 6, consisting of screws having washers 104 and double nuts 105—105 at their outer ends for binding the terminal wires in place. The screws 101, 102, 103, are inserted through the bent over ends of three parallel, alining spring-blades $a'$, $a^2$, $a^3$, with the heads of the screws clamping them in position against the plate 97. The three spring-blades $a'$, $a^2$, $a^3$ overlie in spaced relation three similar companion blades $b'$, $b^2$, $b^3$, see Figs. 5, 7 and 10, which are held in place on the plate 97 in the same manner by binding-screws 111, 112, 113. At the rear of the blades $b'$, $b^2$, $b^3$ is a single blade $c$ held in place on the plate 97 by a binding-post 114. Mounted on the right-hand side of the central arm of the armature N is a fiber plate 106 held in place by clamps 107 and screws 108, see Fig. 6. Inserted through the plate 107 are three binding-posts 116 held in place by nuts 117. At the inner ends of the posts 116 are enlarged contacts 121, 122, 123, see Figs. 7 and 10, adapted to be engaged by contact-studs 118 at the ends of the first series of blades $a'$, $a^2$, $a^3$. The several blades $a'$, $a^2$, $a^3$ carry the plunger-pins $q'$, $q^2$, $q^3$ by which they are operated to break contact at the studs 118 under the action of the wiper 80 carried by the sliding plunger P as before explained. The plunger-pins $q'$, $q^2$, $q^3$ are secured to the blades $a'$, $a^2$, $a^3$ by screws 119 and their outer, rounded ends project through enlarged holes 124 in the armature N without contacting therewith. Each secondary switch-blade $b'$, $b^2$, $b^3$ carries a fiber block 125 held thereon by a screw 126 and adapted to bear against its respective overlying blade in the series $a'$, $a^2$, $a^3$. The blocks 125 serve as insulating means between the two sets of opposite blades while connecting the blades of the second series $b'$, $b^2$, $b^3$ to be moved from the swinging action of the front blades $a'$, $a^2$, $a^3$ in the manner as later explained. At the outer ends of the blades $b'$, $b^2$, $b^3$ are contact-plugs 127 adapted to strike against corresponding plugs 128 on the rearward single blade $c$, the latter having a T-like extension at its end, see dotted lines in Fig. 6, to support the studs in opposite relation to those on the three forward blades. The rearward single blade $c$ is normally sprung forward toward the front blades, as shown in Fig. 7, under its inherent spring-tension and is held in this position by a stop 129 secured to a plate 130 fastened to the edge of the fiber plate 106.

As before stated, the thermostat T may be of any preferred construction and in Fig. 1 it is illustrated as comprising a mushroom casing having a tubular stem $t$ which is inserted through the water-jacket of the engine cylinder C to adapt its operating parts for close communication with the circulating cooling-fluid. Referring to Fig. 10, the casing of the thermostat T encloses a series of contacts $t'$, $t^2$, $t^3$, $t^4$, $t^5$ and $t^6$ which are arranged in spaced relation concentric to the axis of an arm $x$ which carries a contact piece $x'$ at its end adapted to wipe across the fixed contacts $t'$, $t^2$, etc. The arm $x$ is pivoted in the tubular stem of the thermostat casing which also encloses a spiral spring $y$ adapted to expand and contract under the effect of changes in the temperature of the fluid in the cooling system of the engine. One end of the spring $y$ is fixed and its opposite end attached to the arm $x$, whereby the expansion of the spring under a rise in temperature will turn the arm in the direction indicated by the arrow $z$, Fig. 10, to cause its contact $x'$ to wipe across the fixed contacts.

The several contacts $t'$, $t^2$, $t^3$, $t^4$, $t^5$ and $t^6$ are connected by wires 131, 132, 133, 134, 135 and 136 which lead to binding-posts $k'$, $k^2$, $k^3$, $k^4$, $k^5$ and $k^6$, respectively. These latter are of usual arrangement consisting in suitable screws 137 inserted through an angle-iron strip 138 attached to the edge of the upright plate G and insulated therefrom by fiber thimbles and washers 139, see Fig. 4. On the ends of the screws are double nuts 140 for binding the wires thereto. At the lower ends of this series of binding-posts is a seventh post $k^7$ from which leads a wire 142 connected to the battery represented at B, or to a generator or other source of electrical energy. From the battery B a wire 143 is grounded at 144 in the chassis A of the automobile usually by connecting it to one of the side-sills, see Fig. 1. Another wire 148 is also grounded in the chassis frame at 149 with its opposite end connected to the arm $x$ of the thermostat T, as shown in Fig. 10.

Referring still to the wiring chart, Fig. 10, from the binding-post $k^7$ of the battery connection 142 a wire 147 leads to the magnet M, and from this connection are branches $s'$, $s^2$, $s^3$ leading to the several solenoids $S'$, $S^2$, $S^3$ to connect the latter in multiple with the main circuit from the battery. The opposite leads of the solenoids $S'$, $S^2$, $S^3$ extend through wires 151, 152 and 153 connected respectively to the binding-posts 116 of the contacts 121, 122 and 123 on the armature N, see also Figs. 6 and 7. The opposite contacts 118 on the switch-blades $a'$, $a^2$, $a^3$ are connected by wires 154, 155, 156 to alternate binding-posts $k^2$, $k^4$, $k^6$, the latter being connected to the thermostat contacts as before explained. From the binding-posts 111, 112, 113 for the intermediate switch-blades $b'$, $b^2$, $b^3$, wires 157, 158, 159 lead respectively to the left-hand contacts $v'$, $v^2$, $v^3$ of the circuit-closing device V; while from the opposite contacts $v'$, $v^2$, $v^3$ wires 160, 161, 162 lead to the binding-posts $k'$, $k^3$, $k^5$ connected with the thermostat contacts as previously specified. The single binding-post 114 of the rearward switch-blade $c$ is connected by a wire 165 to the magnet M. The complete apparatus and its electrical system having now been described in detail its method of operation on the shutter will next be explained.

Assuming the engine or motor to be at rest or cold, and the shutter D closed as shown in Figs. 1 and 2, the method of operation of the shutter-controlling means is as follows: With the shutter closed its operating-plunger P is in lowermost position as shown in Figs. 4 and 5, and the thermostate contact-arm $x$ will be in its first position to the right of and removed from the fixed contacts $t'$, $t^2$, etc., as indicated in Fig. 10. When the engine is started and the temperature of its cooling system commences to rise the thermostat coil $y$ will expand and the arm $x$ will be turned on its pivot in the direction indicated by the arrow $z$. The initial movement of the arm $x$ carries its contact-block $x'$ across the first contact $t'$ of the series, but since this is connected in circuit 131, $k'$, 160 with the circuit-closing device V, which, with the plunger P at the bottom of its throw, is open, as shown in Fig. 10, there will be no effect on the apparatus. The thermostat T is adjusted so that the contact-arm $x$ may have this slight inoperative range of movement during the period that the engine is "warming up" to the point of its greatest efficiency; but when this point is reached and the temperature rises beyond the maximum required for efficiency then the contact-arm $x$ will be carried beyond the first contact $t'$ to connect it with the second contact $t^2$. This latter connection will close the circuit through the wires 132, 154; switch-blade $a'$ and contacts 118—121 of the switch Q; wire 151 to solenoid S'; and thence through lead $s'$ and wires 147, 142 to the battery B. From the battery B the circuit is completed through wire 143 to ground 144; and from ground 149 through wire 148 back to the arm $x$. It will thus be seen that with this circuit closed by the engagement of the contacts $x'$, $t^2$, as above explained, the lower solenoid S' will be energized from the battery B or other source of current, and the effect of this on the shutter-operating means will be as follows:

The energizing of the solenoid S' will attract its armature H' to raise the plunger P until the armature is balanced in the solenoid. This initial lifting of the plunger P rocks the bell-crank O, connected to its lower end, to cause its arm 27 to slide the connecting-rod 31 to the right, as viewed in Figs. 4 and 10; and this action causes the rod 31 to rock the crank-arm K, see Fig. 2, through an arc of substantially thirty degrees. The crank K being connected to the several shutter slats $d$, $d$ by means of the link L will thus act to open the slats one-third of the full extent, as illustrated by dotted lines in Fig. 2. Referring now to Fig. 5, as the plunger P is lifted the first step by the solenoid S' its latch 75 will ride up over the detent-shoulder $n'$ on the armature or trigger N until its under edge 78 engages therewith to hold the plunger raised. At the same time the wiper-extension 80 on the latch 75 will slide up across the rounded end of the plunger stud $q'$ on the lowermost switch-blade $a'$; but it is to be noted that as the wiper 80 moves into this position the armature N is being pressed rearwardly slightly by the action of the beveled end of the latch 75 on the inclined face of the detent-shoulder $n'$. When, however, the latch 75 and detent $n'$ come into locking engagement the armature or trigger N will swing forward again under the action of its spring 84, and this return of the trigger brings the end of the plunger-pin $q'$ against the wiper 80 whereby to cause the switch-blade $a'$, see Fig. 7, to be sprung back relatively to the armature on which it is mounted. This pressure of the wiper 80 against the end of the pin $q'$ thus causes the spring blade $a'$ to be moved away from the contact 121, see Fig. 10, to open a gap between the latter and the blade-contact 118. The effect of this action is to break the circuit at this point immediately the latch 75 is engaged with its detent $n'$, whereby the flow of current is interrupted and the solenoid S' deenergized again. In this way the solenoid S' remains energized only during the brief period required to lift the shutter-operating plunger P through the first step of its movement and after the latter has been locked in place by its detent the current is cut off so as to avoid depletion of the battery.

The opening of the shutter D to the slight extent above explained allows a limited circulation of air through the radiator R, tending to cool the fluid therein and thus lower the temperature of the engine. In moderately cold weather such limited air circulation will in most cases be sufficient to maintain the engine at the proper temperature to insure its functioning at maximum efficiency. When, however, the outside atmosphere is not so cold a greater amount of circulation is required and my improved device operates automatically to open the shutter to a further extent as next explained. It should be here explained that the fixed contacts in the thermostat T are divided into two series. One series $t'$, $t^3$, $t^5$ are connected in circuit with the electrical control for the downward movement of the plunger P for closing the shutter; while the alternate contacts $t^2$, $t^4$, $t^6$ are in circuit with the controls for lifting the plunger in opening the shutter. This arrangement provides for a limited range of movement of the contact-arm $x$ between the alternate contacts without causing the shifting of the plunger in either direction, the purpose being to prevent the apparatus from becoming over sensitive to very slight changes in the temperature of the cooling system. Stated briefly, when the first movement of the contact-arm $x$ engages it with the first fixed contact $t'$ no action results because the circuit 131, 157, 160 is open at $v'$—$v'$. When, however, the contact-finger $x$ moves forward still further across the next fixed contact $t^2$ it will close the circuit 132, 151, 154 to the solenoid S' to energize the latter to lift the plunger its first step. Likewise the contact-finger $x$ must reach the fourth fixed contact $t^4$ before the plunger P is again raised to still further close the shutter, and the same method of operation is continued throughout the whole series of contacts. In this way a constant opening and closing action of the shutter is avoided, its operation being only effected when sufficient change occurs in the temperature of the engine to reduce its efficiency. After the shutter has been partially opened by the first upward step of the plunger P, under normal conditions the contact arm $x$ may fluctuate between the contacts $t^2$ and $t^3$ without having any effect on the shifting-devices. If, or when, however, the temperature of the outside air is not low enough to maintain the engine at the proper temperature with the first partial opening of the shutter, then the arm $x$ will continue its turning movement under the further expansion of its coil $y$. When the heat of the engine expands the coil sufficiently to carry the arm $x$ around into position with its contact-block $x'$ engaging the fourth contact $t^4$ another operative circuit will be closed as follows: The wire 134 leads from the contact $t^4$ to the binding-post $k^4$, and thence wire 155 leads to the second switch-blade $a^2$ which is closed against the contact 122 on the armature or detent-trigger N. The contact 122 is connected by wire 152 with the second solenoid $S^2$, which, as before explained has its lead $s^2$ connected through the main circuit 147, 142 to the battery B. As before explained, the battery B is grounded at 144 and the contact-arm $x$ at 149 so that the circuit to the solenoid $S^2$ is closed through these connections when the thermostat-arm $x$ engages the contact $t^4$. As the second solenoid $S^2$ is thus energized by the closing of this circuit it will act on its armature $H^2$ to lift the plunger P through its second step. It is to be noted here that the armatures $H'$, $H^2$, $H^3$ are spaced at closer intervals along the plunger P than are the solenoids $S'$, $S^2$, $S^3$ in relation to each other. This provides that as the plunger P is lifted by each solenoid the armature for the next solenoid above is brought part way into its respective solenoid so as to have the proper relation thereto for its attraction thereby. As the second armature $H^2$ is lifted into balanced relation with its solenoid $S^2$ the latch 75 snaps at the upper end of the plunger P over the second detent $n^2$ on the armature-trigger N to lock the plunger in place. At this juncture the return movement of the trigger N causes the plunger-pin $q^2$ on the second switch-blade $a^2$, see Figs. 6 and 7, to ride out against the wiper 80 shown in Fig. 5. The blade $a^2$ is thus caused to break contact with the contact-plug 122 on the trigger N to interrupt the circuit to the solenoid $S^2$ at this point in the same manner that the circuit to the first solenoid $S'$ is broken at the switch $a'$, as first explained. The solenoids $S^2$ will thus be deenergized and waste of current from the battery prevented.

The lifting of the plunger P through the second step of its movement acts through the bell-crank O, link 31 and crank K to open the shutter-slats $d$ thirty degrees farther, or to two-thirds of the full extent as shown by dotted lines in Fig. 3. An increased circulation of air through the radiator is thus provided, but if this is not sufficient to maintain the desired temperature in the cooling system of the engine, then the shutter is opened to the full extent as illustrated by the full lines in Fig. 3 under the further control of the thermostat. This last opening movement is effected by the action of the third solenoid $S^3$ on its armature $H^3$, the circuit for energizing the solenoid $S^3$ being closed by the engagement of the thermostat contact-arm $x$ with the last contact $t^6$. The circuit to the solenoid $S^3$ comprises the wires 136 and 156 leading to the switch-blade $a^3$; the switch-contacts 118—123 and wire 153 leading therefrom to the solenoid; and, on the other side, the wires 147, 142 to battery B; wire 143 to ground 144; and wire 148 from ground 149 to contact-arm $x$. The action of the latch 75 in engaging the third detent $n^3$, and the method of operation of the third switch-blade $a^3$ to break the circuit to the third solenoid $s^3$ being identical with that of the similar elements of the apparatus before explained, no further recitation of the functioning of these parts will be necessary. Suffice it to state that as the contact-arm $x$ is advanced along the fixed contacts of the thermostat by the expansion of its coil $y$ under the action of a continued rise in temperature in the cooling system the plunger P will be raised with a step-by-step action to open the shutter by degrees.

Likewise, upon the falling of the temperature of the engine the contact-arm $x$ will be withdrawn in the opposite direction across the fixed contacts of the thermostat in the series T, and as each alternate contact in the series is engaged thereby the respective circuits for operating the means for closing the shutter will be made active. It is to be understood, however, that the apparatus does not of necessity perform the several steps in the opening or closing of the shutter in regular sequence or succession. On the contrary, the thermostat-control acts selectively to shift the shutter-operating plunger P either up or down from any position according to requirements; that is to say its position may be reversed after each step in its movement in either direction. As a matter of convenience in describing the closing movements of the shutter, however, the functioning of the operating-plunger P will be explained as occurring in three successive downward steps as is sometimes its method of action. Considering then that the plunger P is raised to the upper extreme of its movement, with its latch 75 locked with the third detent $n^3$, the descent of the plunger to close the shutter is effected as follows: It must first be noted that with the plunger P in its uppermost position the circuit-closing wiper W will have been carried up across the opposite fixed contacts $v'$—$v'$, $v^2$—$v^2$, $v^3$—$v^3$ until it bridges the pair last named. It is also to be recalled that with the latch 75 engaged with the third detent $n^3$ the wiper 80 on the latch will be pressed against the plunger-pin $q^3$ on the upper switch-blade $a^3$ to hold the latter sprung back with a gap at the contacts 123—118. This rearward deflection of the switch-blade $a^3$ acts through the insulating-block 125 on the companion blade $b^3$, see Fig. 7, to press the latter back toward the third blade $c$ and thereby connects the terminals of these two rearward blades at the contacts 127, 128. The object of this switch action is to close the circuit to the magnet M at the switch Q, and the same circuit extends through wire 159 to the circuit-closing device V and is closed by the wiper W bridging the contacts $v^3$—$v^3$. The circuit to the magnet M extends from the switch-blade $c$ through the wire 165; and from the opposite lead of the magnet through wires 147 and 142 to battery B; and thence through wire 143, grounds 144, 149 and wire 148 to the thermostat arm $x$. As the arm $x$ is retracted under the influence of a drop in temperature in the cooling system of the engine its engagement with the fixed contact $t^5$ of the thermostat completes the circuit to the magnet M through the following connections: From the contact $t^5$ wire 135 leads to binding-post $k^5$, and thence wire 162 leads to one of the pair of contacts $v^3$—$v^3$ which, as before explained are bridged by the wiper W. From the opposite contact $v^3$ wire 159 leads to switch-blade $b^3$, and this being in contact with blade $c$ at 127, 128, as before noted, the circuit is completed so that current will flow therethrough to the magnet M. As the magnet M is energized it will attract the armature or detent-trigger N, causing it to swing to the right, as viewed in Fig. 5, to release its catch from the latch 75. Upon this release of the locking detents the plunger P will be allowed to drop under the action of gravity and, acting through the bell-crank O will slide the rod 31 to the left, as viewed in Figs. 3 and 4, to close the shutter $d$ one third of the full extent. Immediately the plunger P starts to move downwardly the wiper 80 rides off from the end of the plunger-pin $q^3$ on the switch-blade $a^3$, allowing the latter to spring back against its contact 123, see Figs. 6 and 10. This release of the blade $a^3$ also allows its companion blade $b^3$ to spring forward to open a gap between its contact 127 and the contact 128 on the rearward blade $c$, see Fig. 10. The separation of the blades $b^3$ and $c$ breaks the circuit to the magnet and the latter, becoming de-energized, will release the trigger-armature N. The trigger N will thus be swung back to first position under the action of its compression spring 84, see Fig. 5, whereby the detent-shoulder $n^2$ will be carried into position to engage the latch 75 to check the further drop of the plunger P. It is to be here noted that the downward movement of the plunger P is rendered sluggish under the action of the cushion-device or dash-pot U connected to its lower end, and functioning for this purpose in the manner as previously explained. This provides that the trigger N, which is released practically instantaneously with the release of the latch 75 from the upper detent $n^3$, will have plenty of time to swing back to bring its second detent $n^2$ into position to be engaged by the latch, and likewise in the case of the shifting of the latch from the second detent $n^2$ to the lowermost detent $n'$. The action of plunger 34 in the dash-pot U also cushions the latch 75 on the main plunger P from striking too abruptly against the detents and further prevents it from jerking the shutter-slats, which would tend to break or cause wear on their pivots. The lifting of the plunger P under the attraction of the solenoids is naturally somewhat retarded by the effect of gravity, and thus all of its shifting movements are rendered smooth and even so as not to impose sudden shock or jars on the parts of the mechanism or on the shutter which it operates.

As the plunger P drops to the second position the wiper 80 rides across the end of the plunger-pin $q^2$ on the switch-blade $a^2$ and forces the latter rearwardly to press its companion blade $b^2$ into contact with the blade $c$. At the same time the wiper W is slid down into position to bridge the gap between the fixed contacts $v^2$—$v^2$, see Fig. 10, so that the second circuit to the magnet M is closed at these points. Consequently, if or when the thermostat arm $x$ recedes still farther under a further drop in the temperature of the engine, as its block $x'$ is carried against the fixed contact $t^3$ the circuit to the magnet M is completed through wires 133, 161; contacts $v^2$—$v^2$ and wiper W; wire 158 and switch-blades $b^2$, $c$; and wire 165. From the opposite lead of the magnet the circuit extends through the main wires 147, 142 to the battery B; and thence through the grounds 144, 149 to the arm $x$, as in the previously described first circuit for the magnet. The energizing of the magnet M through this circuit attracts the trigger-armature N to release the second detent $n^2$ from the latch 75 and the plunger P is thus allowed to drop until the latch locks it at the lower detent $n'$ in the same manner as in the first step of its movement as above described. This second shift of the plunger P closes the shutter to the extent illustrated by the dotted lines in Fig. 2, and during this action the wiper W is carried into position between the contacts $v'$—$v'$, while the wiper 80 releases the plunger-pin $q^2$ to break the second circuit at 127—128 and engages the first pin $q'$ to close the third circuit to the magnet M at the contacts of the switch-blades $b'$, $c$.

When the operation of the engine is arrested, or if in extreme cold weather its temperature falls to too low a point with the shutter closed two-thirds of the way, then the thermostat arm $x$ will be moved back across the contact t' and the third magnet circuit through wires 131, 160; contacts v'—v'; wire 157; and switch-blades b', c, will be closed and upon the release of the detent n' by the armature N the plunger P will drop to lowermost position to close the shutter completely as shown in full lines in Fig. 2. This last action of the plunger opens the gap between the lower switch-blade b' and blade c so that all of the magnet circuits are interrupted at the switch Q, and also at the contact device V by the dropping of the wiper W as illustrated in Fig. 10. It will also be observed from the chart, Fig. 10, that all of the solenoid circuits remain closed at the switch Q so that the apparatus is set to respond again to the forward movement of the contact-arm x across the fixed contacts in the manner as first explained.

It is also to be noted that each time the operating-plunger P is raised a step to open the shutter it operates the automatic switch Q to not only break the circuit of the solenoid which has just lifted it, but also to set the switch to close the appropriate magnet circuit whereby the plunger may be immediately released to drop and close the shutter again. In this way provision is made for moving the plunger selectively in opposite directions through the control of the thermostat under varying fluctations of temperature. The device is thus entirely automatic in regulating the temperature of the engine, a mean temperature for insuring the maximum efficiency of the motor being maintained at all times under extreme changes in the temperature of the outside atmosphere. It will therefore be appreciated that my improved apparatus is of signal advantage for use with internal-combustion engines applied to various purposes. When employed on automobiles or trucks the automatic closing of the shutter when the motor stops acts to retain the heat under the hood or bonnet of the car to make starting easier in cold weather; and when the engine is running the adjustment of the shutter slats under automatic control of the thermostat maintains the engine at its point of highest efficiency while also conserving fuel and lubricant. When applied to the motors of airplanes and dirigibles my improved, automatic regulation of the temperature of the engine under extreme changes in the temperature of the atmosphere at different levels provides for operating it continuously at maximum speed, a most important consideration on aircraft. My apparatus is also adapted for use on water craft such as speed boats and may be applied to other purposes of a different nature. For instance, it may be employed on valves for steam or other heating agents; for operating the dampers of furnaces; for opening ventilators, and for all uses where an even temperature is required. While I have herein shown the mechanism of the apparatus as arranged for three shifts of the controlling-member, it will be obvious that the range of action of the device may be indefinitely extended by increasing the number of solenoids and detent-stops as required.

While I am aware that it is old in the art to provide thermostatically-controlled electrically-operated means for opening and closing shutters, dampers, valves or the like, I believe that I am the first to devise an apparatus which is automatically selective in its range of operation as regards the opening and closing of the shutter or damper to different extents, and therefore I claim this feature broadly. Also, it is to be understood that I do not wish to limit my claims to the embodiment of the apparatus herein shown and described for, obviously, various modifications might be made in the structure and arrangement of its mechanism without departing from the spirit or scope of the invention.

What I claim is:

1. In a device of the type specified, the combination with a movable control-member adapted to normally assume a predetermined position, of electrical-means for shifting said member to varying extents from its normal position, detent-means for locking said member in the different positions of shift, electrical-means for releasing said detent-means, a plurality of normally-open circuits for the electrical-means, and a thermostat for closing the different circuits to selectively operate the different electrical-means under the effect of changes in temperature.

2. In a device of the type specified, the combination with a shiftable control-member adapted to normally assume a predetermined position, of a series of solenoids for shifting said member with a step-by-step movement away from its normal position, detent-means for holding said member in the different positions of shift, electrical-means for releasing the detent-means, a plurality of circuits for selectively energizing the solenoids and operating the detent-releasing means, and a thermostat for closing the different circuits under the effect of changes in temperature.

3. In an apparatus of the class specified, the combination with a shiftable control-member adapted to normally assume a predetermined position, of means to shift said member to different extents from its normal position, detent-means for holding said member in its different positions of shift, electrical-means for operating the shifting-means and releasing the detent-means, a plurality of circuits for selectively energizing the several electrical-means, and a thermostat for closing the individual circuits under the effect of changes in temperature.

4. In an apparatus of the type specified, the combination with a shiftable control-member, of electrically-operated means for shifting said member to different positions, electrically-operated detent-means for locking said member in its different positions of shift, a source of current, a series of circuits for connecting the shifting-means and detent-means with the source of current, a thermostat for selectively closing said circuits, and contact-devices for automatically opening and closing the alternate circuits to the shifting-means and detent-means.

5. In an apparatus of the type described, the combination with a shiftable control-member, of electrically-operated means for shifting said member to different positions, electrically-operated detent-means for locking said member in the different positions of shift, a plurality of circuits for the shifting-and detent-means, a source of current included in said circuits, a thermostat for selectively closing said circuits, a multiple switch for all of the circuits, and means actuated from the movement of the control-member to operate the switch to alternately open the circuits to the shifting-means and close the circuits to the detent-means.

6. In a device of the type specified, the combination with a shiftable control-member, of a plurality of solenoids for shifting said member to different extents, a series of detents for locking said member in its different positions of shift, an electro-magnet for releasing the detents, a source of current, a series of circuits connecting the source of current with the solenoids and magnet, and a thermostat for alternately closing the solenoid and magnet circuits under the effect of a rise or fall in temperture.

7. In a device of the type specified, the combination with a shiftable control-member, of a plurality of solenoids for shifting said member through a series of steps, detent-means for locking said member in its different positions of shift, an electro-magnet for releasing the detent-means, a source of current, a series of circuits for connecting the solenoids and magnet with the source of current, a thermostat for selectively closing said circuits, a contact-device for successively closing the several circuits to the magnet as the control-member is shifted in either direction, and a switch for alternately opening the solenoid circuits and closing the magnet circuits in succession during the shifting movement of the control-member.

8. In an apparatus of the type specified, the combination with a shiftable control-member, of a plurality of solenoids for shifting said member with a step-by-step action, detent-means for locking said member in its different positions of shift, an electro-magnet for releasing the detent-means, a plurality of separate circuits for the solenoids and magnet, a source of current in said circuits, a thermostat for selectively closing said circuits, a multiple switch having opposite sets of contacts for the solenoid and magnet circuits, and means operated from the movement of the control-member to open one set of contacts and close the other set at each shifting movement of the member.

9. In an apparatus of the type specified, the combination with a shiftable control-member, of a plurality of solenoids for shifting said member with a step-by-step action, detent-means for locking said member in its different positions of shift, an electro-magnet for releasing the detent-means, a plurality of circuits for the solenoids and magnet, a source of current in said circuits, a thermostat for selectively closing said circuits, a multiple switch having opposite sets of spring-contacts for the solenoid and magnet circuits, and a wiper-device operated from the movement of the control-member to force the contacts of one set apart and those of the opposite set together at each shifting movement of the member.

10. In an apparatus of the type specified, the combination with a shiftable control-member, of electrically-controlled means for shifting said member, a movable detent-member having a series of catches, a latch on the control-member for engaging the detent-catches to hold the member in different positions, electrical-means for releasing the detent-member from the latch, and a thermostat for selectively energizing the different electrical-means.

11. In a device of the type specified, the combination with a shiftable control-member, of electrically-operated means for shifting said member with a step-by-step action, electrically-operated detent-means for locking said member in its different positions of shift, a plurality of separate circuits for controlling the operation of the shifting-means and detent-means, a source of current means and detent-means, a source of current in said circuits, a thermostat having a series of fixed contacts arranged in alternate connection with the circuits for the shifting-means and detent-means, and a movable contact-member operated under the effect of changes in temperature to move along the fixed contacts In testimony whereof I affix my signature,

EDGAR TREGONING.